United States Patent
Dong et al.

(10) Patent No.: US 8,775,397 B2
(45) Date of Patent: Jul. 8, 2014

(54) DATABASE ACCESS ACCELERATION

(71) Applicant: SAP AG, Walldorf (DE)

(72) Inventors: Bin Dong, Shanghai (CN); Wen-Syan Li, Fremont, CA (US); Zheng Long Wei, Shanghai (CN); Yongyuan Shen, Shanghai (CN); Qi Sun, Shanghai (CN)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/644,974

(22) Filed: Oct. 4, 2012

(65) Prior Publication Data

US 2013/0346380 A1  Dec. 26, 2013

Related U.S. Application Data

(60) Provisional application No. 61/664,509, filed on Jun. 26, 2012.

(51) Int. Cl.
*G06F 7/00* (2006.01)
*G06F 17/30* (2006.01)

(52) U.S. Cl.
CPC ............................... *G06F 17/30545* (2013.01)

USPC .......................................................... 707/705

(58) Field of Classification Search
None
See application file for complete search history.

(56) References Cited

U.S. PATENT DOCUMENTS

2003/0217064 A1* 11/2003 Walters .......................... 707/100
2004/0215883 A1* 10/2004 Bamford et al. .............. 711/129
2010/0122172 A1* 5/2010 Mongeau et al. ............. 715/733

* cited by examiner

*Primary Examiner* — Jay Morrison
(74) *Attorney, Agent, or Firm* — Brake Hughes Bellermann LLP (57) ABSTRACT

A system includes a request analyzer configured to receive a plurality of database requests and classify the plurality of database requests as transaction requester or non-transaction requests, and further configured to route the transaction requests to a transaction server for application against a transaction database, including write access to an identified portion thereof, and to route the non-transaction requests to a non-transaction server to thereby read data obtained from a non-transaction database. The system also includes an update manager configured to update the non-transaction database, based on the application of the transaction requests against the transaction database.

20 Claims, 5 Drawing Sheets

DATABASE ACCESS ACCELERATION

CROSS-REFERENCE TO RELATED APPLICATION

This application is a Nonprovisional of, and claims priority to, U.S. Patent Application No. 61/664,509, filed on Jun. 26, 2012, entitled "WEB ACCELERATION FOR REAL TIME INVENTORY MANAGEMENT AND DYNAMIC PRICING", which is incorporated by reference herein in its entirety.

TECHNICAL FIELD

This description relates to accessing databases.

BACKGROUND

Databases are designed and utilized to store and organize information in a manner that facilitates fast access to desired data. For example, a user may wish to identify and/or modify the contents of a particular column, row, or individual cell of a database table.

In theory, such database interactions may be straightforward to implement. In many specific settings, however, there are practical limits to an extent to which such database operations may be performed in a desired manner. For example, a rate at which a database is capable of identifying and accessing/modifying stored data may reach a threshold or maximum level, beyond which results are not returned within an acceptable timeframe.

It is possible, again from a theoretical perspective, to provide sufficient hardware resources (i.e., processing power and/or memory) to manage virtually any number or rate of database operations, while providing virtually any desired response time. From a practical perspective, however, it may be prohibitively expensive to purchase and maintain such levels of hardware resources. Moreover, in settings in which a number of requests for database operations varies widely over time, the quantity of hardware resources required to manage the highest volume (e.g., peak volume) of database operations may be significantly larger than the quantity of hardware resources required during normal or low volumes of database operations. Consequently, at any given time in such settings, it may occur that a significant percentage of the hardware resources are not being utilized, and are therefore used inefficiently.

Thus, many database providers are faced with a suboptimal choice between extensive/inefficient hardware resources on the one hand, or providing users of the databases with unacceptably low levels of performance on the other. Meanwhile, the users (e.g., customers) may correspondingly be faced with either increased cost of use of the databases, and/or with experiences of database interactions that are inconvenient or unacceptable.

SUMMARY

According to one general aspect, a system may include instructions recorded on a computer-readable medium, and executable by at least one processor. The system may include a request analyzer configured to cause the at least one processor to receive a plurality of database requests and classify the plurality of database requests as transaction requester or non-transaction requests, and further configured to cause the at least one processor to route the transaction requests to a transaction server for application against a transaction database, including write access to an identified portion thereof, and to route the non-transaction requests to a non-transaction server to thereby read data obtained from a non-transaction database. The system may further include an update manager configured to cause the at least one processor to update the non-transaction database, based on the application of the transaction requests against the transaction database.

According to another general aspect, a computer-implemented method for executing instructions stored on a computer readable storage medium may include receiving a plurality of database requests and classifying the plurality of database requests as transaction requester or non-transaction requests. The method may include routing the transaction requests to a transaction server for application against a transaction database, including write access to an identified portion thereof, routing the non-transaction requests to a non-transaction server to thereby read data obtained from a non-transaction database, and updating the non-transaction database, based on the application of the transaction requests against the transaction database.

According to another general aspect, a computer program product tangibly embodied on a computer-readable storage medium may include instructions that, when executed, are configured to receive a plurality of database requests, and classify the plurality of database requests as transaction requester or non-transaction requests. When executed, the instructions may be further configured to route the transaction requests to a transaction server for application against a transaction database, including write access to an identified portion thereof, route the non-transaction requests to a non-transaction server to thereby read data obtained from a non-transaction database, and update the non-transaction database, based on the application of the transaction requests against the transaction database.

The details of one or more implementations are set forth in the accompanying drawings and the description below. Other features will be apparent from the description and drawings, and from the claims.

DETAILED DESCRIPTION

Figure 1:
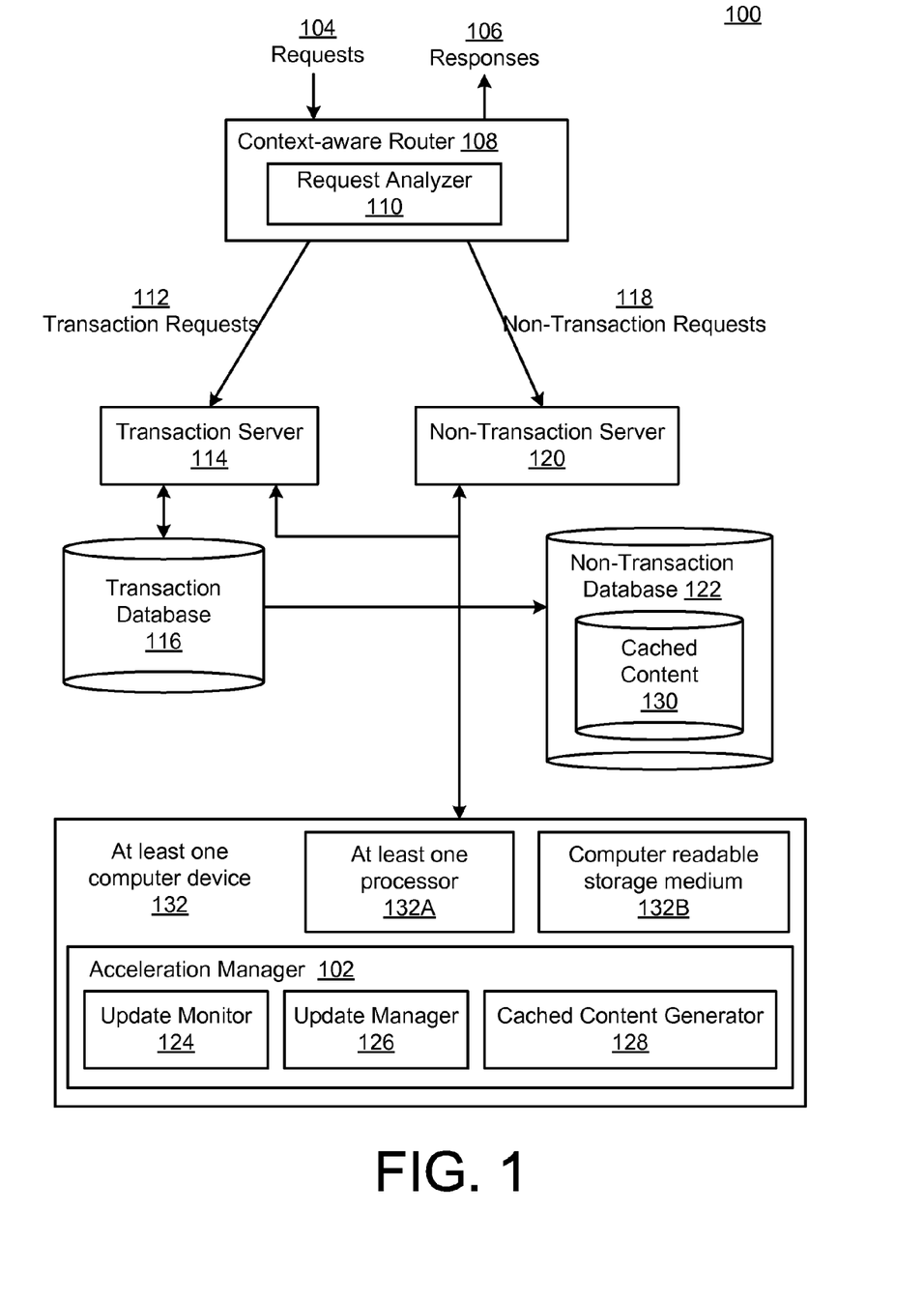
FIG. 1 is a block diagram of a system for database access acceleration.

FIG. 1 is a block diagram of a system 100 for database access acceleration. In the example of FIG. 1, an acceleration manager 102 is operable to facilitate handling of requests 104, so as to thereby provide responses 106 in a timely and efficient manner. Moreover, the acceleration manager 102 may be configured to provide the responses 106, even when the requests 104 includes a very large number of concurrent requests, received within relatively short periods of time. Further, the acceleration manager 102 may be configured to facilitate the providing of the responses 106 in a manner that utilizes available hardware and software resources in a highly efficient manner, thereby minimizing costs and expenses associated with the purchase and maintenance of such resources.

In the example of FIG. 1, the requests 104 is received at a context-aware router 108, which includes a request analyzer 110. As described in detail below, the request analyzer 110 may be configured to classify each of the requests 104 as either transaction requests 112, or non-transaction requests 118. As shown, the transaction requests 112 may be provided to a transaction server 114, for application against a transaction database 116. Meanwhile, the non-transaction requests 118 may be provided to a non-transaction server 120, to thereby return content includes in, or otherwise associated with, a non-transaction database 122.

In the example of FIG. 1, the term transaction refers generally to any type of interaction related to a modification of contents of the transaction database 116. For example, such a transaction may refer to a write access to a particular row, column, or cell of one or more tables of the transaction database 116. Similarly, as described below in detail with respect to the example of FIG. 3, a transaction may refer to, or include, an action of a consumer or other user who sends a request of the request 104 and/or receives a response of the responses 106, where such action is ultimately associated with a write access to the transaction database 116. For example, a consumer may conduct a purchase transaction for an item for sale by way of a retail website, and the transaction database 116 may be utilized to store, e.g., price or availability information related to the item for sale. In this case, the term transaction may refer to the purchase transaction as being associated with corresponding modifications to the transaction database 116 (e.g., an indication of reduced availability of an item after its purchase by the consumer) that reflect the choices and actions of the consumer in question.

Thus, it may be appreciated that the non-transaction requests 118, in contrast, may refer generally to requests of the requests 104 which do not require write access. Instead, the non-transaction request 118 may require only, e.g., a read access of information stored in, or related to, the non-transaction database 122.

Thus, execution of a transaction request 112 may generally take a relatively longer amount of time than execution of a non-transaction request 118. That is, it may take marginally longer to identify, access, and modify a particular, desired portion of the transaction database 116, than to simply identify and read desired information included in, or associated with, the non-transaction database 122.

Moreover, in various example scenarios, some of which are described in detail below, it may occur that the requests 104 are received in large numbers and within relatively short timeframes, and in simultaneous or overlapping manners. Moreover, various ones of the requests 104 may seek to affect the same or overlapping portions of the transaction database 116.

For example, requests from multiple consumers may be received to purchase an identical item for sale. Consequently, in order to maintain consistency of the transaction database 116, it may be necessary to execute locking operations with respect to database content that is modified in response to one or more of the transaction-related requests 112. For example, if two overlapping requests are received for the purchase of a last-remaining item for sale, then a portion of the transaction database 116 which provides an availability of the item for sale must be locked during the transaction with the consumer corresponding to the first-received request, so that the consumer associated with the second-received request may accurately be informed that the item for sale was not available at a time of the request of the second consumer. Although such locking operations may be necessary in order to avoid confusion and other difficulties associated with the processing of the requests 104, the locking operations also may be responsible for significant relative increases in access times, as compared to read operations (which may generally be conducted in a parallel or overlapping manner, without regard for a concurrency of related requests).

Further, the transaction-related requests 112, by their nature, may be associated with rapid, unpredictable and dynamic changes to contents of the transaction database 116. In contrast, it may occur that much of the information associated with the non-transaction database 122 may change relatively infrequently. For example, continuing the examples referenced above, it may occur that items for sale may be associated with descriptive information, which may not change significantly over periods of weeks/months, even though, in contrast, associated price and availability information may change on a minute-by-minute or second by second basis.

In practice, then, transactions executed with respect to the transaction database 116, i.e., in response to receipt of the transaction-related requests 112, may generally result in changes to contents of portions of the transaction database 116. Further, it may or may not be necessary to reflect such changes with respect to the non-transaction database 122.

In this regard, as shown, the acceleration manager 102 may include an update monitor 124, which may be configured to monitor the transaction server 114 and/or the transaction database 116, in order to detect and identify changes to the transaction database 116. The update monitor 124 may be further configured to notify an update manager 126 of the changes to the transaction database 116. Then, the update manager 126 may be configured to update data associated with the non-transaction database 122 in an appropriate (e.g., as-needed) manner.

Further, in the example of FIG. 1, the acceleration manager 102 may include a cached content generator 128, which may be configured to provide cached content 130 with respect to the non-transaction database 122. For example, the cached content generator 128 may be configured to execute queries against data of the non-transaction database 122, in an attempt to ensure that the cached content 130 includes, in-memory, information which is likely to be requested by the non-transaction request 118. In this way, portions of the cached content 130 may be quickly and readily available to be provided within responses 106 to the non-transaction requests 118.

In example implementations, the cached content 130 may be generated on a periodic basis, e.g., after a certain amount of time, or after a certain number of requests 104. When updated frequently, the cached content 130 may be more likely to provide current or exact information, but at a cost of increased usage of associated resources required by the cached content generator 128 to provide such updates to the cached content 130. Conversely, the usage of such resources may be conserved by providing fewer or less frequent updates to the cached content 130, at the cost of potentially providing less timely and/or less accurate information in response to the non-transaction request 118.

Nonetheless, and in the example implementations of the system 100, it may be assumed that the data of the non-transaction database 122, and thus of the cached content 130, changes relatively infrequently, as compared to transaction-related data in the transaction database 116. In such scenarios, then, the use of the cached content 130 may provide for increased speed of providing responses to the non-transaction requests 118, with little or no impact on an accuracy or effective timeliness of the information provided. Within such contexts, then, it may be appreciated that exact settings with respect to whether, how, and when the cached content 130 is provided or updated may vary, and may be optimized in a desired manner by an operator of the system 100.

In the example implementations, and as described in more detail below with respect to FIG. 3, the cached content 130 may be partitioned, and stored locally with a plurality of servers represented by the non-transaction server 120. In such scenarios, it may be appreciated that such a plurality of non-transaction servers, particularly if placed strategically from a geographical or a network perspective, may be faster and more efficient in providing necessary portions of the cached content 130 which may be required to respond to specific ones of the non-transaction requests 118.

Moreover, as referenced above, transaction-related changes to the transaction database 116 may be detected by the update monitor 124, which may subsequently notify the update manager 126, accordingly. As referenced above, and described in more detail below, the update manager 126 may be configured to determine whether and to what extent such transaction-related changes may need to be reflected within the non-transaction database 122 and/or within the cached content 130.

For example, some such transaction-related changes may always be required to be reflected within the cached content 130, while other such changes may only need to be reflected to the extent that the changes cause corresponding data within the transaction database 116 to rise above (or fall below) a pre-defined threshold. Thus, some changes within the transaction database 116 may not need to be reflected within the non-transaction database 122 and/or the cached content 130.

Moreover, the update manager 126 need not be required to perform any such corresponding updates immediately. Instead, for example, the update manager 126 may execute updates after a predetermined period of time, and/or in response to receipt of a certain threshold number of detected updates. Upon execution of such updates to the non-transaction database 122, the update manager 126 may notify the cached content generator 128 to update the cached content 130 in a corresponding manner (i.e., based on the updates to the non-transaction database 122).

With the structure and functions described herein, the system 100 is capable of handling a very large number of concurrently received requests 104, with a relatively minimal amount of hardware/software resources, and in a fast and accurate manner. In the example embodiments, the system 100 may be optimize for scenarios in which such large numbers of the requests 104 include a relatively small percentage of transaction-related requests 112, compared to the non-transaction requests 118. In such scenarios, as shown and described, the transaction-related requests 112 may be separated for real time processing by the transaction server 114 using the transaction database 116. Thus, senders of the requests 104 may receive corresponding responses 106 in a fast and reliable manner, even when such transactions are required.

Meanwhile, the non-transaction requests 118, which by nature and definition can tolerate higher latencies with respect to a currency of requested information, may be answered by the non-transaction server 120 in a satisfactory manner, using information from or associated with the non-transaction database 122, e.g., the cached content 130. As described, the updated monitor 124 and the update manager 126 may be configured to update such information, based on transactions conducted with respect to the transaction database 116, and in a manner which balances the need to perform such updates with respect to advantages gained by updating the cached content 130 (using the cached content generator 128) in a periodic or batched fashion.

In the example of FIG. 1, the acceleration manager 102 is illustrated as being executed by at least one computing device 132, which itself includes, or is associated with, at least one processor 132A and computer-readable storage medium 132B. In the simplified example of FIG. 1, the acceleration manager 102 and illustrated components 124-128 are illustrated as being executed by the at least one computing device 132. However, in additional or alternative implementations, it may be appreciated that various components of the acceleration manager 102 may be executed using two or more such computing devices.

For example, the update monitor 124 may be executed at, or in conjunction with, the transaction server 114 and/or the transaction database 116, and may transmit update notifications to the update manager 126, which may itself be implemented at, or in conjunction with, the non-transaction server 120 and/or the non-transaction database 122. In example embodiments, the transaction database 116 and the non-transaction database 122 may include at least some portions which are identical or substantially identical, in which case the update monitor 124 may transmit only a delta or change that is required to be made in conjunction with the non-transaction database 122, and based on a previous transaction conducted with respect to the transaction database 116. By expressing required updates as deltas to currently-stored data, the update monitor 124 may be required to transmit a relatively minimal amount of information, while the update manager 126 may be responsible only for ensuring that such deltas are reflected within corresponding tables of the non-transaction database 122.

Somewhat similarly, the cached content generator 128 may express corresponding updates to the cached content 130 as deltas or changes from previously existing versions of the cached content 130, so that the cached content 130 also may be updated in a fast and efficient manner. Further details of examples regarding the use of such deltas in operations of the acceleration manager 102 are provided below, e.g., with respect to FIG. 3.

Thus, it may be appreciated that the acceleration manager 102, or portions thereof, may be implemented in a disbursed or distributed fashion. For example, the request analyzer 110 may be considered to be part of the acceleration manager 102.

More generally, it may be appreciated that any one component of the acceleration manager 102 may be implemented as two or more separate subcomponents, perhaps distributed over a network. Conversely, it may occur that any two or more components of the acceleration manager 102 may be implemented as a single component having a combined functionality of the two or more components.

Figure 2:
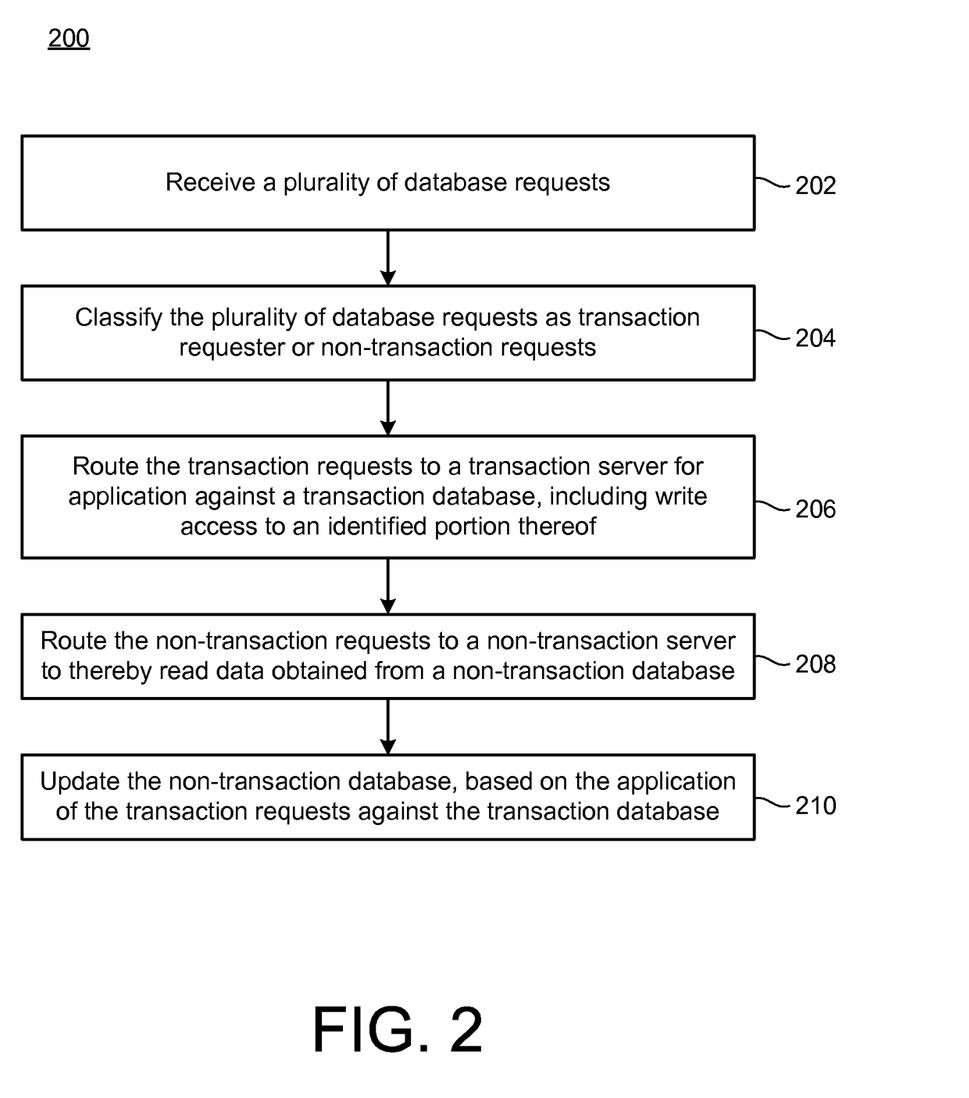
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations. However, it may be appreciated that in additional or alternative embodiments, two or more of the operations 202-210 may be executed in a partially or completely overlapping or parallel manner, and/or may be executed in a nested, iterative, or looped fashion. Further, in various example embodiments, one or more of the operations 202-210 may be modified or omitted, and additional operations or sub-operations, not specifically illustrated in the example of FIG. 2, may be included.

In the example of FIG. 2, a plurality of database requests may be received (202). For example, the request analyzer 110 may be configured to receive the requests 104. In described examples, the requests 104 may include requests associated with a database-based web application or webpage, such as consumer requests received by an ecommerce website which relies on one or more backend databases to store information related to, e.g., pricing, inventory, availability, and other aspects of order fulfillment. In other examples, such requests may be received in any virtually any setting in which data is desired to be accessed within a database.

The plurality of database requests may be classified as transaction requests or non-transaction requests (204). For example, the request analyzer 110 may be configured to classify the requests 104 as either transaction request 112, or non-transaction request 118. In the example just mentioned, the request analyzer 110 may be configured to utilize information obtained by the context-aware router 108, such as information contained in a uniform resource locator (URL) associated with the request in question, in identifying a corresponding website and corresponding action desired by the sender of the request in question (e.g., to consummate a purchase of an item in the context of a checkout procedure of the website).

The transaction requests may be routed to a transaction server for application against a transaction database, including write access to an identified portion thereof (206). For example, the request analyzer 110 may be configured to route the transaction requests 112 to the transaction server 114, for application against the transaction database 116. As described above, such transaction requests may specify or otherwise require updates to contents of the transaction database 116. For example, continuing the example described above, a checkout process conducted with respect to inventory items of an ecommerce website will generally result in a reduction in a corresponding number of available items remaining for sale after consummation of the purchase in question.

Meanwhile, the non-transaction request may be routed to a non-transaction server, to thereby read data obtained from a non-transaction database (208). For example, the request analyzer 110 may route the non-transaction requests 118 to the non-transaction server 120, to thereby read data obtained from the non-transaction database 122. As described, such data may be obtained directly from tables of the non-transaction database 122. In additional or alternative examples, and as described, the non-transaction requests 118 may be utilized to read the cached content 130 which has previously been obtained from contents of the non-transaction database 122.

For example, again continuing the examples from above, a particular non-transaction request may be to retrieve availability information regarding an item for sale, where the sender of the request simply wishes to know about availability thereof, but is not yet prepared to consummate a corresponding purchase transaction. In such scenarios, the sender of the corresponding non-transaction request requires only an indication of suitable availability of the item for sale, and typically does not require current information specifying an exact number of such remaining items (unless, e.g., the number of remaining items is particularly low, in which case exact availability information may be desired or required).

The non-transaction database may be updated, based on the application of the transaction requests against the transaction database (210). For example, the update monitor 124 may be configured to detect and identify the application of each transaction request 112 against the transaction database 116, and may be further configured to transmit such updates (perhaps expressed as deltas to existing database content) to the update manager 126. The update manager 126 may thereafter be configured to execute corresponding updates to the non-transaction database 122, where, as described, such updates may include operations of the cached content generator 128 in updating the cached content 130. In scenarios (e.g., in the example of FIG. 3), in which the cached content 130 is partitioned or otherwise distributed among a plurality of the non-transaction servers 120, the cached content generator 128 may further be configured to update corresponding partitions of the cached content 130 at relevant ones of the plurality of non-transaction servers 120.

In the types of scenarios described above related to availability information of items for sale, it may occur that a purchase transaction associated with a given item may be consummated with respect to the transaction database 116, which may be associated with locking operations for corresponding rows or cells of the transaction database 116. Once consummated, the update manager 124 may transmit identification of the transaction to the update manager 126, which may proceed to make a determination as to whether and when it is necessary to execute corresponding updates to the non-transaction database 122 and/or the cached content 130.

For example, as referenced above, the update manager 126 may determine that the consummated transaction does not require an update to the availability of the item within the cached content 130, because of a currently large remaining inventory of the item in question. In other example scenarios, the update manager 126 may determine that, after consummation of the transaction in question, a number of available ones of the item in inventory have dropped below a threshold level, below which availability updates are required to be more specific. In such scenarios, the cached content generator 128 may update the cached content 130 to specify a specific number of the items remaining in inventory. Moreover, the update manager 126 may determine that such updates should be thereafter conducted more frequently, until it is determined an inventory of the item in question has been sufficiently replenished.

Figure 3:
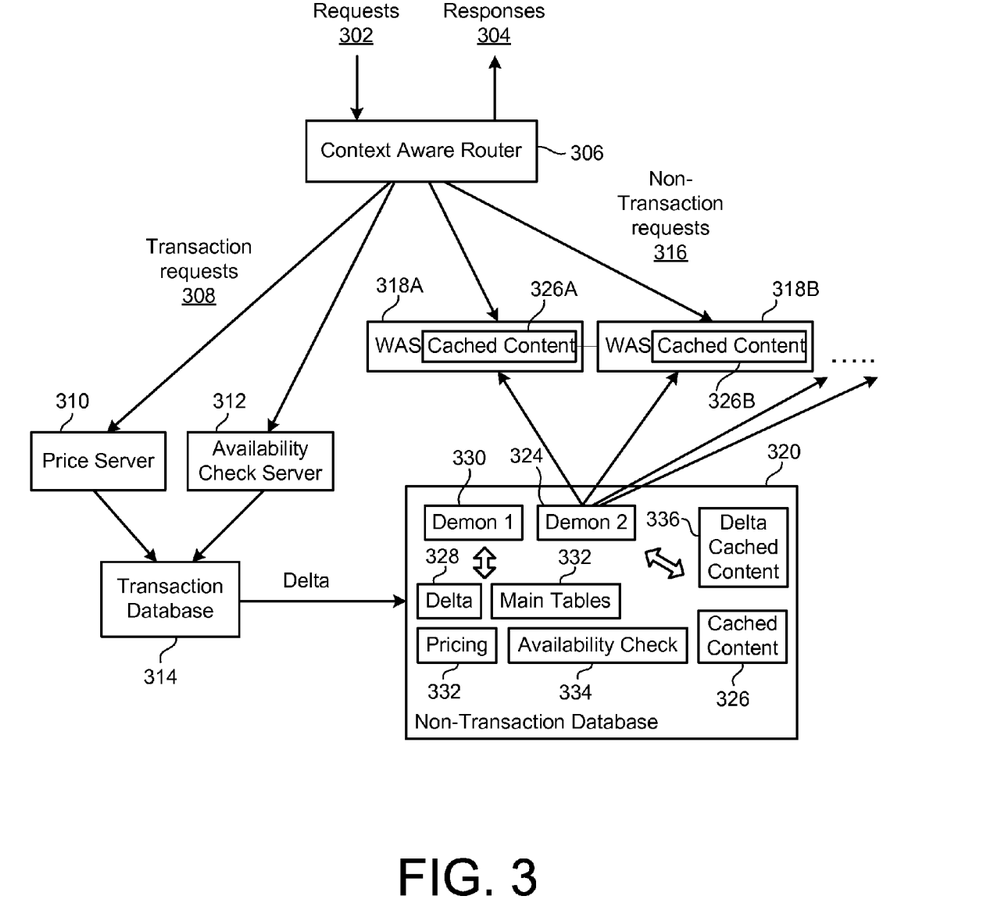
FIG. 3 is a block diagram of a more detailed example implementation of the system of FIG. 1.

FIG. 3 is a block diagram of a system 300 illustrating a more detailed example implementation of the system 100 of FIG. 1. More specifically, FIG. 3 illustrates an example implementation and scenarios such as those mentioned above, in which an ecommerce website provides items for sale.

Such scenarios may benefit particularly from implementation of the system 100 of FIG. 1. For example, a typical ecommerce site may be required to provide product information, as well as associated availability and pricing information, in sub-second response time, and may be required to handle peak traffic of, e.g., thousands of requests 302 per second. Meanwhile, product information may be relatively static, e.g., may not change significantly over time until if and when a new release or version of the product is made available. Nonetheless, as referenced above, the availability of the associated product within an inventory may change quickly from location to location, and, similarly, the pricing information may change dynamically, depending on current or projected sales levels and/or on a customer-by-customer basis.

In practice, ecommerce sites may utilize a server farm of web and application servers (WAS), in order to distribute an overall workload, and normally in a manner which reflects an actual geographical distribution of customers. From the WAS farm, underlying or backend databases may be utilized to provide, e.g., inventory information, user profile information, pricing policies, and availability information. As already referenced, any of the requests 302 which require write access to such backend databases may also require corresponding lock operations on relevant rows, in order to ensure data consistency, at a cost to the overall throughput of the ecommerce site.

In such scenarios, however, a substantially large majority of the request 302 may include non-transaction requests 316, while only a correspondingly small fraction of the request 302 may include transaction requests 308. Consequently, such scenarios are particularly suitable for implementations of the system 100 of FIG. 1. Therefore, in FIG. 3, a context-aware router 306 may be utilized to classify the request 302 as either the transaction request 308 or the non-transaction request 316.

In this regard, it may be observed in the example of FIG. 3 that the request analyzer 110 is not illustrated as such within the context-aware router 306. Nonetheless, it may be appreciated that functionality of the request analyzer 110 may be implemented using the context-aware router 306, as described with respect to FIG. 1. Additionally, or alternatively, the request analyzer 110 may be implemented in conjunction with one or more of the various servers 310, 312, 318A-318B described herein.

In the context of the example of FIG. 3, however, as shown, the context-aware router 306 may provide the functionality of classifying transaction requests 308 and the non-transaction requests 316. In this way, the non-transaction requests 316 may be scaled out, while all relevant updates resulting from the transaction requests 308 may be processed in real time or near real time. In this way, responses 304 may be provided to the various consumers in a suitable manner, without requiring excessive levels of hardware/software resources on the part of an operator of the system 300.

In the example of FIG. 3, the transaction server 114 of FIG. 1 is illustrated as including multiple servers 310, 312, each providing a particular function. Specifically, as shown, a price server 310 may be configured to process transaction requests 308 related to pricing information, while an availability check server 312 may be configured to process transaction requests 308 related to an availability of a relevant product for sale. By distributing the transaction requests 308 over multiple servers 310, 312, the various transactions may be processed in an overlapping, parallel manner, for increased speed, efficiency, and reliability.

Meanwhile, as referenced, servers 318A, 318B represent the non-transaction server 120 of FIG. 1. Specifically, the servers 318A, 318B provide examples of servers of a WAS farm.

Further with respect to FIG. 3, a transaction database 314 represents, or corresponds to, the transaction database 116, while a non-transaction database 320 corresponds to, or represents, the non-transaction database 122 of FIG. 1. In this regard, it may be appreciated that at least a portion of the non-transaction database 320 may be copied from the contents of the transaction database 314. That is, for example, the transaction database 314 may serve as a primary database, a subset of which may be copied for use as, or within, the non-transaction database 320.

Specifically, main tables 322 may represent such a copied portion or subset of contents of the transaction database 314. Then, a pricing procedure 332 and availability check procedure 334 may be utilized to generate cached content 326. Then, a demon 324 may be responsible for distributing partitions of the cached content 326 as cached content 326A, 326B for storage using corresponding servers 318A, 318B of the WAS farm.

With reference to FIG. 1, it may be appreciated that the cached content 326A and 326B, together making up the totality of cached content 326, may represent pre-generated data regarding product availability and price, made available within the WAS farm so that otherwise complex queries, availability checks, and pricing may be replaced by extremely fast and scalable memory lookup operations. In particular, as the cached contents are encoded to store, e.g., product number, availability, date, and price (or similarly small/reduced datasets) the cached contents occupy relatively small memory space within the WAS server farm. For example, cached information for 5 million products may require only about one 1 GB of memory. Consequently, the solution of FIG. 3 may scale up to handle requirements of very large ecommerce sites. Furthermore, the partitioning of the cached content 326 and to partitions 326A, 326B allows for virtually unlimited scalability with respect to number of products for sale.

Further with reference to FIG. 1, it may be appreciated that, in FIG. 3, the pricing procedure 332 and availability check procedure 334, together with the demon 324, may represent or provide some or all of the functionality of the cached content generator 128 of FIG. 1. In other words, for example, as described, the procedures 332, 334 may be responsible for initialing populating the cached content 326, while the demon 324 is responsible for partitioning and distributing the cached content 326A, 326B. For example, the demon 324 may partition the cached content 330 according to, e.g., types or classifications of product, or by product number (e.g., by individual serial numbers of each product). Thereafter, on an ongoing basis, as referenced above and described in more detail below, the procedures 332, 334 may be responsible for updating the cached content 326 in response to transactions executed with respect to the transaction database 314. In the example of FIG. 3, such updates to the cached content 326 may initially be expressed as a delta of the cached content 336, so that the demon 324 may continually update the partitioned cached content 326A, 326B, using only the delta 336 of the cached content. In this way, updates to the partitioned cached content 326A, 326B may be implemented in a fast and efficient manner, while requiring a minimal amount of associated hardware/software/network resources.

In the example of FIG. 3, it may again be appreciated from the description of FIG. 1 above that transactions conducted with respect to the transaction database 314 may be reflected at the non-transaction database 320. Specifically, in response to one or more such transactions and associated updates of the transaction database 314, a corresponding delta 328 may be transmitted from the transaction database 314 to the non-transaction database 320. In the example of FIG. 3, the delta 328 may represent a temporary table of data, which is accumulated over time and/or over a number of updates to the transaction database 314. Thereafter, a demon 330 may be configured to perform a merge operation of the delta table 328 and the main tables 322. In conjunction with such merge operations, as already described, the pricing and availability check processes 332, 334 may correspondingly update the cached content 326.

Thus, in example implementations, a potentially large majority of the requests 302, e.g., read requests, may be offloaded from the primary/transaction database 314 to the secondary/non-transaction database 320. In this way, the transaction request 308 (e.g., write request), may be executed on a relatively less-loaded server (e.g., the servers 310, 312), and may thereby be performed relatively faster with relatively fewer hardware/software resources. Meanwhile, as also described, all such updates to the transaction database 314 may be copied from the database 314 to the database 320 in real time, so that the delta 336 of the cached content 326 may be calculated, e.g., immediately after the updates are propagated to the secondary/non-transaction database 320. In this way, in example implementations, the partitioned cached contents 326A, 326B in the WAS farm may be maintained in real time or near real time. In this way, the response 304 may be provided in a fast, accurate, and otherwise suitable manner.

Figure 4:
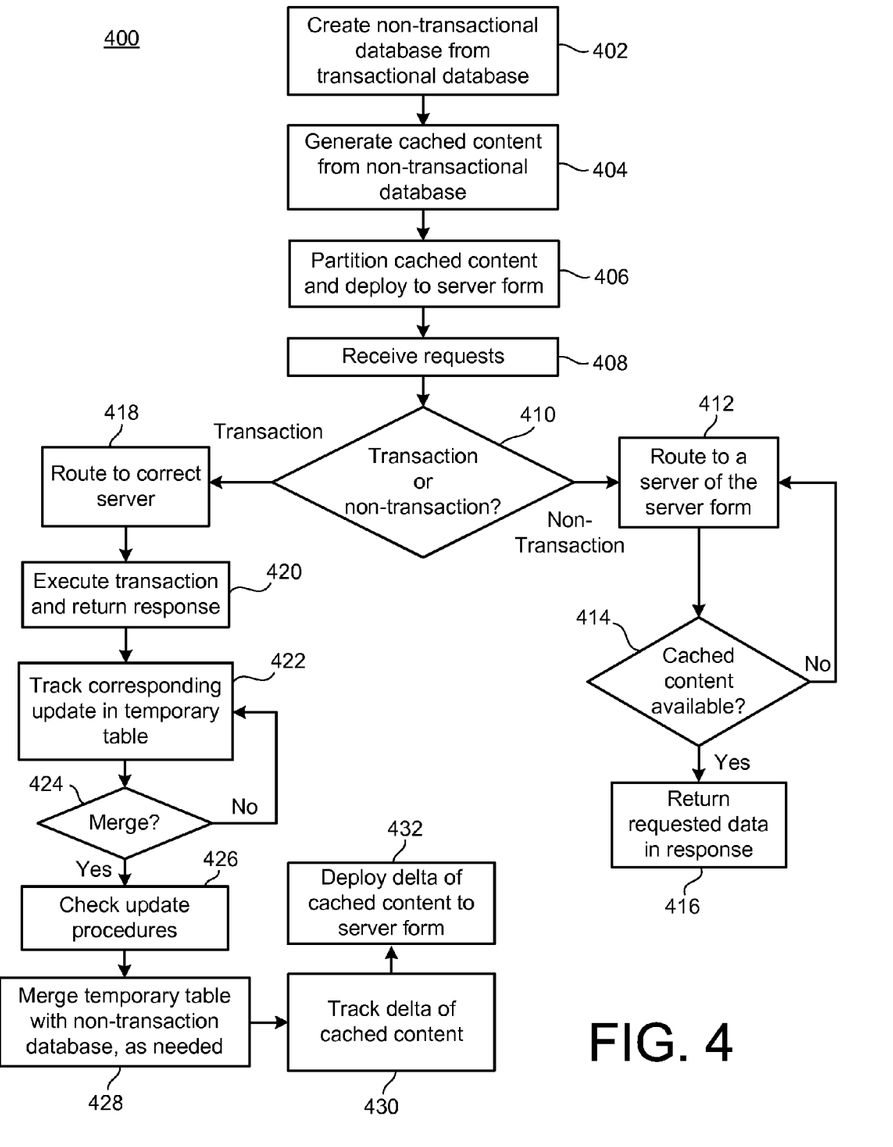
FIG. 4 is a flowchart illustrating example operations of the system of FIG. 3.

FIG. 4 is a flowchart 400 illustrating example operations of the system 300 of FIG. 3. In the example of FIG. 4, the non-transaction database 320 may be created at least in part from the transaction database 314 (402). For example, the main tables 322 of the non-transaction database 320 may be copied from corresponding portions of the transaction database 314.

The cached content 326 may be generated based thereon, in the context of the non-transaction database 320 (404). For example, the pricing process 332 and the availability check process 334 may issue queries against the main tables 322 for storage of the corresponding query results within the cached content 326.

The demon 324 may thereafter partition the cached content 326 for deployment onto the WAS farm 318A, 318B (406). In this regard, as referenced above, it is apparent that the specifically illustrated servers 318A, 318B are intended to represent, or correspond to, a potentially large plurality of such servers.

Thereafter, requests 302 may be received (408). For example, the request 302 may be received, as shown, at the context-aware router 306.

Thereafter, either at the context-aware router 306 and/or at one or more of the servers 310/312 and/or 318A/318B, the request 302 may be classified as either transaction request 308 or non-transaction request 316 (410). For example, functionality of the request analyzer 110 may be implemented in FIG. 3 by examining a URL string associated with each request of the request 302.

Thereafter, the non-transaction request 316 may be distributed or otherwise routed to a server of the WAS farm (412), perhaps, e.g., in a round robin or other suitable fashion. In this way, load balancing among the various servers of the WAS farm 318A, 318B may be implemented.

In this context, as a particular server of the WAS farm receives a routed request of the non-transaction request 316, the server in question may analyze its corresponding cached content (e.g., the portioned cached content 326A) in order to determine whether the requested data exists therein for inclusion within the responses 304 (414). For example, the server 318A may seek to match a product number of other suitable identifier contained within the non-transaction request 316 with portions of the cached content 326A.

If the cached content is not available (414), then the non-transaction request 316 in question may be routed to a different server of the WAS farm 318A, 318B. Once the cached content is determined to include the requested data at a particular server of the WAS farm 318A, 318B (414), then the requested data may be returned accordingly within the responses 304.

On the other hand, if the request 302 are determined to include transaction request 308 (410), then the transaction request in question will be routed to a correct transaction server, e.g., the price server 310 and/or the availability check server 312 (418). In the example, as shown and described, the corresponding price and availability check transactions may be executed using the two separate servers 310, 312, including the sending of corresponding, separate queries to the underlying transaction database 314. In this way, the requested transaction may be executed, and an indication thereof may be returned within the responses 304 (420).

As described, the resulting update to the transaction database 314 may be tracked within a temporary table 328 of the non-transaction database 320 (422). For example, as shown and described, the transaction database 314 may transmit a delta representing changes caused by the update in question to the delta table 328.

At a designated time, and/or in response to a designated event(s), the demon 330 may issue a query against the delta table 328, in order to generate corresponding updates or products whose price, availability, available date, location, or other such parameter may need to be changed. That is, for example, a frequency at which such queries run may be set as occurring, e.g., on-demand, once the delta table 328 is not empty, after a set number of seconds, or in response to some other event(s).

As described, not all of the information contained within the delta table 328 will necessary result in updates to the cached content 326, or thereby to the partitioned cached contents 326A, 326B. For example, as referenced above, some websites display only an indication of availability or non-availability of a particular product, instead of a more specific number of items in inventory stock. In such cases, the cached content 326 may not need to be updated, as long as a number of available products and inventory stock is higher than some threshold.

Thus, as long as the merge operations of the demon 330 with respect to the delta table 328 have not yet been triggered (424), the delta table 328 may continue to track corresponding updates (422). Once merge operations are triggered (424), the merger may proceed in accordance with the corresponding processes/procedures 332, 334 (426).

In this way, the temporary delta table 328 may be merged with the main tables 322 of the non-transaction database 320, as needed (428). In this context, the delta 336 of the cached content may be tracked (430), e.g., by the demon 324. In other words, as described, updates to the transaction database 314 may result in potential changes to the main tables 322, where such changes may be governed by the processes 332, 334, and may result in changes (i.e., delta 336) to the cached content 336. Consequently, the demon 324 may be configured to thereafter deploy the resulting delta 336 of the cached content to corresponding, appropriate servers of the WAS farm 318A, 318B.

In practice, existing tools may be utilized to synchronize the non-transaction database 320 with the transaction database 314 in real time or near real time. For example, the SAP landscape transformation (SLT) tool may be utilized to move updates to the transaction database 314 to the delta table 328. The non-transaction database 320 may be partially or completely implemented using an in-memory database, such as HANA, the in-memory database technology of SAP AG of Walldorf, Germany. In this way, as described, the non-transaction request 316 may be satisfied using extremely fast and scalable memory lookups within the partitioned cached content 326A, 326B.

Figure 5:
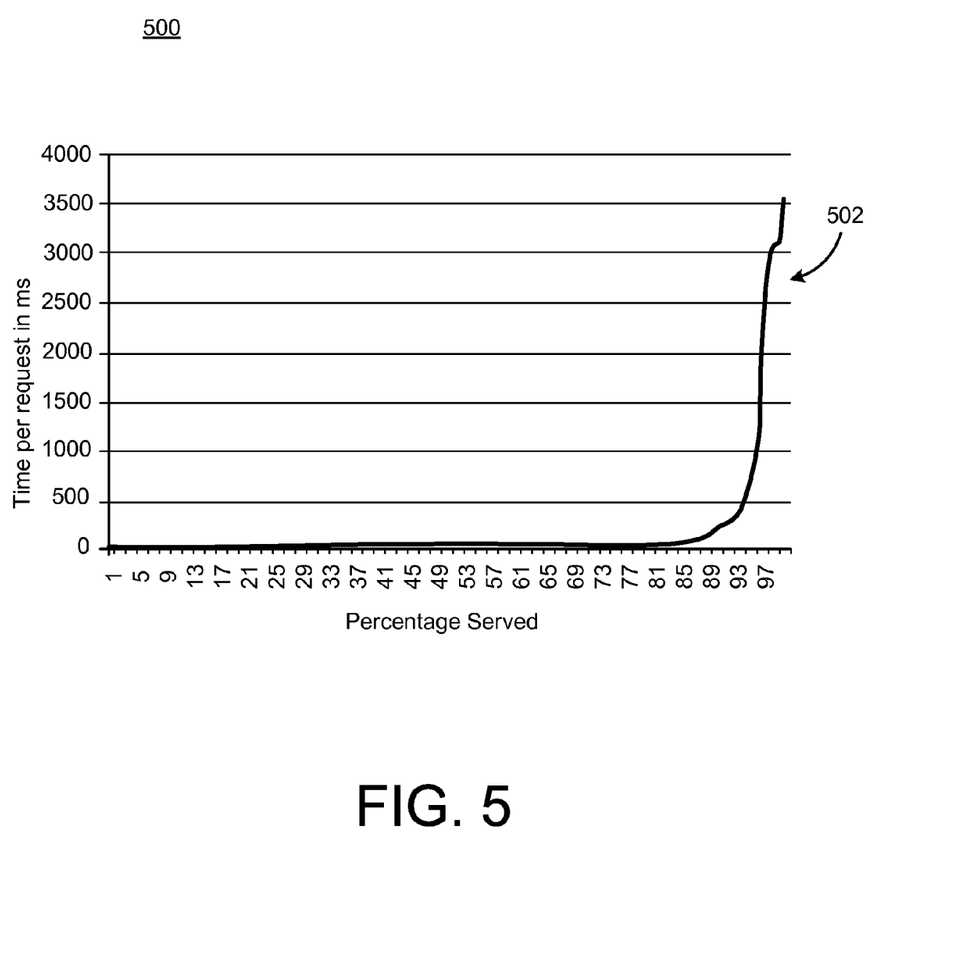
FIG. 5 is a graph illustrating example operations of the system of FIG. 3.

FIG. 5 is a graph 500 illustrating an example implementation of the system 300 of FIG. 3. In generating the graph 500, a WAS farm is utilized with 316 GB of main memory, while the transaction database 314 and the non-transaction database 320 may be implemented using two corresponding 192 GB main memories.

In the example, it is assumed that a total number of unique items is approximately 5 million, and that a concurrency level of approximately 2000 current requests may be active at any time. In the example, a total time taken may be about 229 seconds, while a total number of requests served may be about 2 million, so that an average of requests served per second amounts to 2 million/229=8733.6. Consequently, an average response time per request amounts to 229.984 milliseconds. Thus, FIG. 5 may be understood to illustrate a distribution of the response times for the 2 million requests, as illustrated by distribution 502.

In summary, the present description provides techniques for acceleration of database-based websites, such as ecommerce websites which require real time product availability and price checks for high volumes of request rates. Of course, many additional or alternative implementations, beyond those shown and described herein, may be executed. For example, with respect to FIG. 1, the transaction database 116 and the non-transaction database 122 may be implemented using a single database, as well as a side-by-side configuration illustrated in FIG. 1 (and in FIG. 3). The servers 114, 120 may be implemented integrally with corresponding databases 116, 130. In additional or alternative example implementations, the demon 330 of FIG. 3 (corresponding generally to the update manager 126 of FIG. 1) may process hundreds of updates of the transaction database 314 in a single query against the temporary delta table 328.

In additional or alternative implementations, the WAS farm 318A, 318B may be deployed, with no expiration time set for the associated cached content 326A, 326B. Alternatively, a time to live of all such cached content 326A, 326B may be set to some period of time, e.g., four hours. In the latter case, a price of each item may be calculated daily in advance, and served via a price server, such as the price server 310 of FIG. 3. Then, non-transaction requests may be sent to the WAS farm 318A, 318B to determine if a cached hit exists. If not, the request may be sent to one or both of the price server 310 and/or the availability check server 312, so that the requested information may be generated and returned to the WAS farm for inclusion within an appropriate partition of the cached content 326A, 326B. In such scenarios, transaction requests may still be sent directly through a corresponding price server 310 and/or availability check server 312. Many additional or alternative variations may be implemented, as would be apparent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium, and executable by at least one semiconductor processor, the system comprising:
   an acceleration manager configured to cause the at least one semiconductor processor to manage access to a database of data records corresponding to items for sale, including separating each data record into a transaction portion requiring relatively frequent updates and a non-transaction portion requiring relatively infrequent updates, wherein the transaction portions are stored in a transaction database and the non-transaction portions are stored in main memory in a non-transaction database, the acceleration manager including
   a request analyzer configured to cause the at least one semiconductor processor to receive a plurality of database requests and classify the plurality of database requests as transaction requests or non-transaction requests, and further configured to cause the at least one processor to route the transaction requests to a transaction server for application against the transaction database, including write access to identified portions thereof, and to route the non-transaction requests to a non-transaction server to thereby read data obtained from the non-transaction database; and an update manager configured to cause the at least one semiconductor processor to update the non-transaction database, based on the application of the transaction requests against the transaction database.

2. The system of claim 1, wherein the requests are received by way of a website associated with the transaction server and the non-transaction server.

3. The system of claim 2, wherein the request analyzer is configured to cause the at least one processor to route the requests based on Uniform Resource Locators (URLs) associated with the requests.

4. The system of claim 1, wherein the non-transaction portions of the data records included in the non-transaction database are copied from corresponding portions of the data records of the transaction database.

5. The system of claim 1, comprising a cached content generator configured to cause the at least one processor to generate cached content including processing the transaction portions and/or the non-transaction portions, wherein the cached content is stored in the non-transaction database in the main memory and at least some of the non-transaction requests are satisfied using the cached content.

6. The system of claim 5, wherein the non-transaction server includes at least two non-transaction servers, and wherein the cached content generator is further configured to cause the at least one processor to partition the cached content and distribute the partitioned cached content among the at least two non-transaction servers.

7. The system of claim 5, wherein the cached content generator is further configured to update the cached content, based on the update of the non-transaction database.

8. The system of claim 7, wherein the cached content generator is further configured to update the cached content, based on a delta between the cached content and the updated cached content.

9. The system of claim 1, comprising an update monitor configured to cause the at least one processor to detect the applications of the transaction requests against the transaction database, and further configured to provide a notification to the update manager regarding a result thereof.

10. The system of claim 9, wherein the notification includes a delta characterizing a difference between the non-transaction database and the transaction database, following the applications.

11. The system of claim 9, wherein the update manager is further configured to cause the at least one processor to maintain the delta in a temporary table over a plurality of the notifications, and to merge the temporary table with the non-transaction database.

12. A computer-implemented method for executing instructions stored on a computer readable storage medium, the method comprising:

managing access to a database of data records corresponding to items for sale, including separating each data record into a transaction portion requiring relatively frequent updates and a non-transaction portion requiring relatively infrequent updates, wherein the transaction portions are stored in a transaction database and the non-transaction portions are stored in main memory in a non-transaction database;

receiving a plurality of database requests;

classifying the plurality of database requests as transaction requests or non-transaction requests;

routing the transaction requests to a transaction server for application against the transaction database, including write access to identified portions thereof;

routing the non-transaction requests to a non-transaction server to thereby read data obtained from the non-transaction database; and updating the non-transaction database, based on the application of the transaction requests against the transaction database.

13. The method of claim 12, further comprising generating cached content including processing the transaction portions and/or the non-transaction portions, wherein the cached content is stored in the non-transaction database in the main memory and at least some of the non-transaction requests are satisfied using the cached content.

14. The method of claim 13, wherein the non-transaction server includes at least two non-transaction servers, and wherein the cached content is partitioned and distributed among the at least two non-transaction servers.

15. The method of claim 12, wherein the updating the non-transaction database comprises:

detecting the applications of the transaction requests against the transaction database; and providing a notification to the update manager regarding a result thereof.

16. A computer program product, the computer program product being tangibly embodied on a non-transitory computer-readable storage medium and comprising instructions that, when executed, are configured to:

manage access to a database of data records corresponding to items for sale, including separating each data record into a transaction portion requiring relatively frequent updates and a non-transaction portion requiring relatively infrequent updates, wherein the transaction portions are stored in a transaction database and the non-transaction portions are stored in main memory in a non-transaction database;

receive a plurality of database requests;

classify the plurality of database requests as transaction requests or non-transaction requests;

route the transaction requests to a transaction server for application against the transaction database, including write access to identified portions thereof;

route the non-transaction requests to a non-transaction server to thereby read data obtained from the non-transaction database; and update the non-transaction database, based on the application of the transaction requests against the transaction database.

17. The computer program product of claim 16, wherein the requests are received by way of a website associated with the transaction server and the non-transaction server.

18. The computer program product of claim 16, wherein the instructions, when executed, are further configured to generate cached content including processing the transaction portions and/or the non-transaction portions, wherein the cached content is stored in the non-transaction database in the main memory and at least some of the non-transaction requests are satisfied using the cached content.

19. The computer program product of claim 17, wherein the non-transaction server includes at least two non-transaction servers, and wherein the cached content is partitioned and distributed among the at least two non-transaction servers.

20. The computer program product of claim 16, wherein, in the updating the non-transaction database, the instructions are further configured to:

detect the applications of the transaction requests against the transaction database; and provide a notification to the update manager regarding a result thereof.

* * * * *